(12) United States Patent
Vandenberg

(10) Patent No.: US 6,491,512 B2
(45) Date of Patent: Dec. 10, 2002

(54) TWO-STAGE EJECTION SYSTEM FOR AN INJECTION MOLD

(76) Inventor: Leo A. Vandenberg, 32995 Meadow Rd., Wildwood, IL (US) 60030

( * ) Notice: Subject to any disclaimer, the term of this patent is extended or adjusted under 35 U.S.C. 154(b) by 0 days.

(21) Appl. No.: 09/769,717

(22) Filed: Jan. 25, 2001

(65) Prior Publication Data

US 2002/0098259 A1 Jul. 25, 2002

(51) Int. Cl.[7] ............................................... B29C 45/40
(52) U.S. Cl. ........................................ 425/556; 425/444
(58) Field of Search .............................. 425/436 R, 438, 425/444, 556

(56) References Cited

U.S. PATENT DOCUMENTS

| | | | |
|---|---|---|---|
| 3,572,424 A | * | 3/1971 | Byrne .......................... 425/556 |
| 5,227,178 A | * | 7/1993 | Rieker .......................... 425/556 |
| 5,256,364 A | | 10/1993 | Herbst |
| 5,494,435 A | * | 2/1996 | Vandenberg .............. 425/450.1 |

* cited by examiner

Primary Examiner—Tim Heitbrink
(74) Attorney, Agent, or Firm—Henderson & Sturm LLP

(57) ABSTRACT

A two-stage ejection system for an injection mold that allows the mold plates to move at the same time and then allows selected plates to be stopped in a locked position while the other plates continue to move. The system includes an external bushing, an internal bushing that carries cam retainers, and an ejector pin. The system may be used in an injection mold having in sequence a stationary plate, a stripper plate, a support plate and an ejection plate. The external bushing is secured to the support plate, the internal bushing is secured to the stripper plate, and the ejector pin is secured to the ejection plate. The cam retainers selectively engage grooves in the external bushing or ejector pin to lock their respective attached plates from moving with respect to each other while the other plates continue to move.

2 Claims, 4 Drawing Sheets

TWO-STAGE EJECTION SYSTEM FOR AN INJECTION MOLD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the field of injection molding apparatus, and more particularly to a two-stage ejection system for an injection mold.

2. Description of the Related Art

In injection molds that include multiple plates there are many uses for a device that allows the plates to move at the same time for a given distance, and then allows one of the plates to stop in a locked position while the other plates continue to move. Devices that are presently available do not allow the plates to be locked mechanically without possibility of damage to the mold if a plate moves out of sequence.

As a consequence of the foregoing situation, there has existed a longstanding need for a new and improved two-stage ejection system for an injection mold, and the provision of such a construction is a stated objective of the present invention.

BRIEF SUMMARY OF THE INVENTION

Briefly stated, the present invention provides a two-stage ejection system for an injection mold that allows the mold plates to move at the same time and then allows selected plates to be stopped in a locked position while the other plates continue to move. The system includes an external bushing, an internal bushing that carries cam retainers, and an ejector pin. The system may be used in an injection mold having in sequence a stationary plate, a stripper plate, a support plate and an ejection plate. The external bushing is secured to the support plate, the internal bushing is secured to the stripper plate, and the ejector pin is secured to the ejection plate. The cam retainers selectively engage grooves in the external bushing or ejector pin to lock their respective attached plates from moving with respect to each other while the other plates continue to move.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 4:
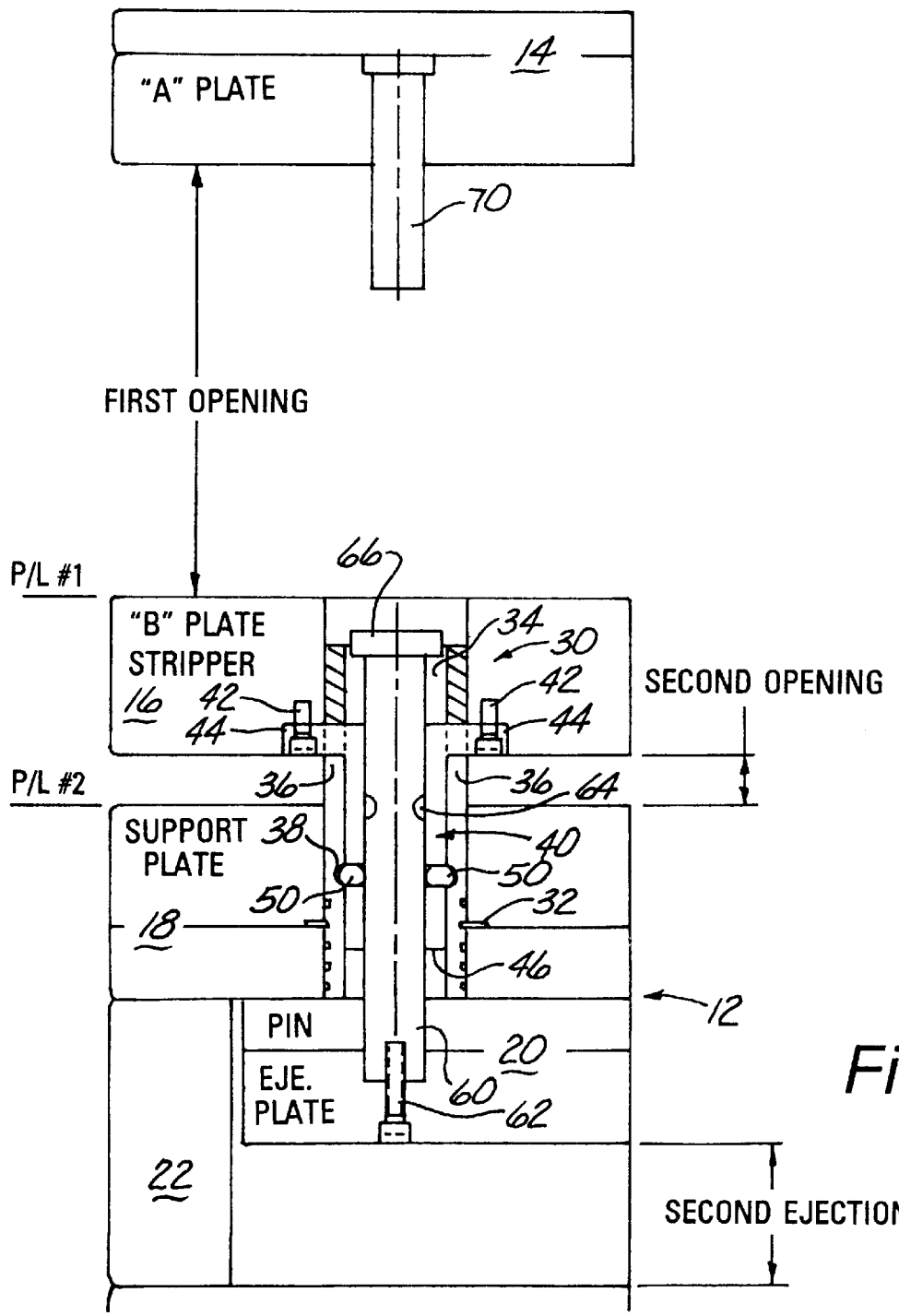
FIG. 4 is a sectional view similar to FIGS. 1–3, but showing the ejection plate moved to the second ejection position while the ejection plate and the support plate are locked together by engagement of the cam retainers in the groove of the external bushing.

As can be seen by reference to the drawings, and in particular to FIGS. 1–4, the two-stage ejection system that forms the basis of the present invention is designated generally by the reference number 10. The ejection system 10 is installed in the interior of a multi-plate mold 12 that includes in sequence a stationary plate 14, a stripper plate 16, a support plate 18, and an ejection plate 20 secured and aligned with the ejector housing 22 by a number of tie rods (not shown). A first parting line is located at the contacting surfaces of the stationary plate 14 and the stripper plate 16, and a second parting line is at the contacting surfaces of the stripper plate 16 and the support plate 18. The ejection plate 20 is sequentially movable in the ejector housing 22 toward the support plate 18 to a first ejection position (FIG. 3), and then to a second ejection position (FIG. 4).

The ejection system 10 includes four main components: an external bushing 30, an internal bushing 40, cam retainer fingers 50, and an ejector pin 60. In addition, the ejection system 10 may include a return pin 70, although it is not required for the ejection system to function.

The ejection system 10 is located internal to the mold plates and allows for travel of the various plates. The system 10 is held in position by various retaining means. The external bushing 30 is received within a bore in the stripper plate 16 and support plate 18 and is secured to the support plate 18 by a radially extending ring 32 that is clamped between two sections of the support plate 18. The external bushing 30 includes a first axial bore 34 with a pair of opposed axially directed slots 36 and an internal annular ring 38.

The internal bushing 40 is received in the first axial bore 34 of the external bushing 30 and is secured to the stripper plate 16 by fasteners 42 that extend through the pair of wings 44. The wings 44 slidably engage the slots 36, in a manner similar to the cam retainer and travel bushing disclosed in U.S. Pat. No. 5,494,435. The internal bushing 40 has a second axial bore 46 with four radially directed cam retainer fingers 50 that selectively extend outwardly (FIG. 4) or inwardly (FIGS. 1–3) from the wall of the internal bushing 40 and are secured therein, for example as disclosed in U.S. Pat. No. 5,494,435.

The ejection pin 60 is received in the second axial bore 46 of the internal bushing 40 and is secured to the ejection plate 20 by fastener 62. The ejection pin 60 includes an external annular groove 64 disposed to selectively receive the cam retainers 50 when they extend inwardly from the wall of the internal bushing 40. Also, the pin 60 includes an enlarged heel 66 disposed to engage the end of the internal bushing 40 to align the external annular groove 64 with the cam retainers 50.

Figure 1:
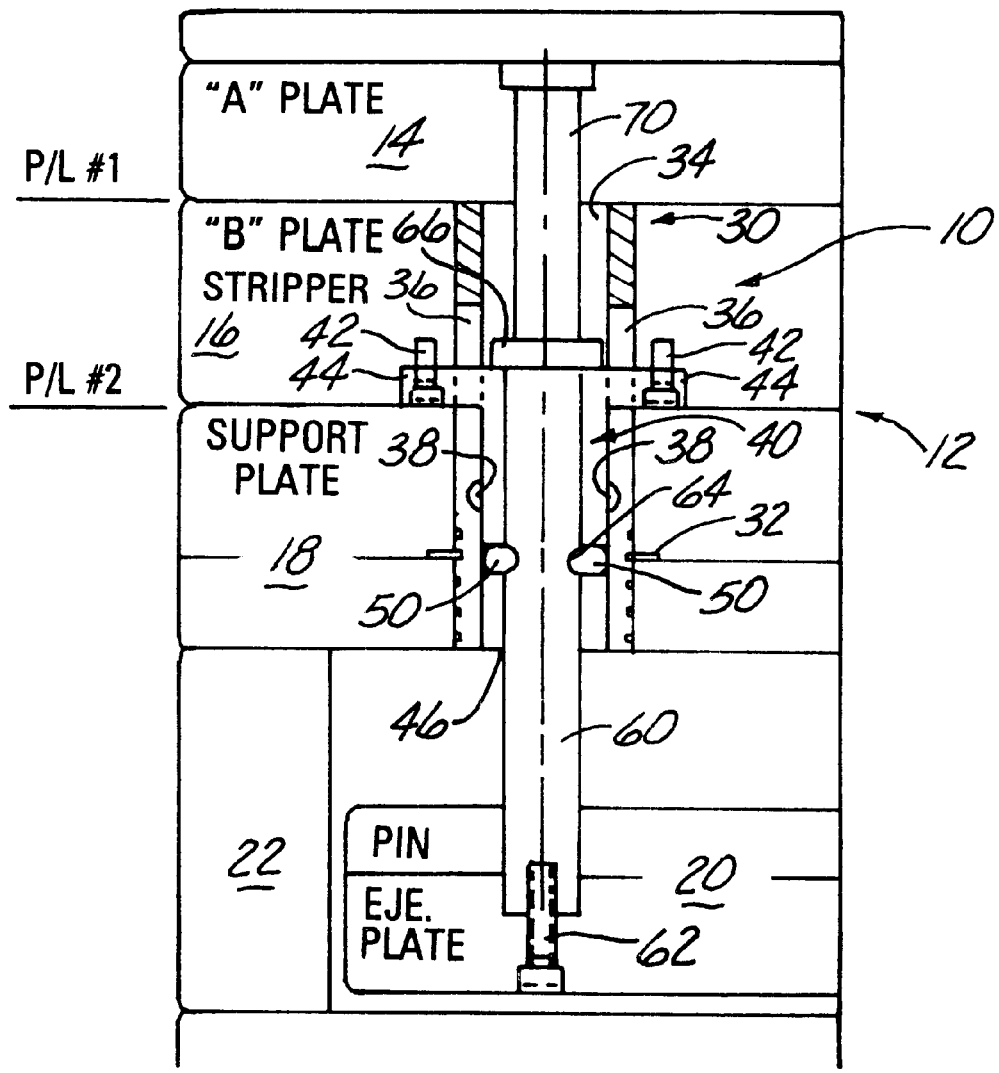
FIG. 1 is a sectional view showing the internally disposed two-stage ejection system where the mold is in the closed position.
Figure 2:
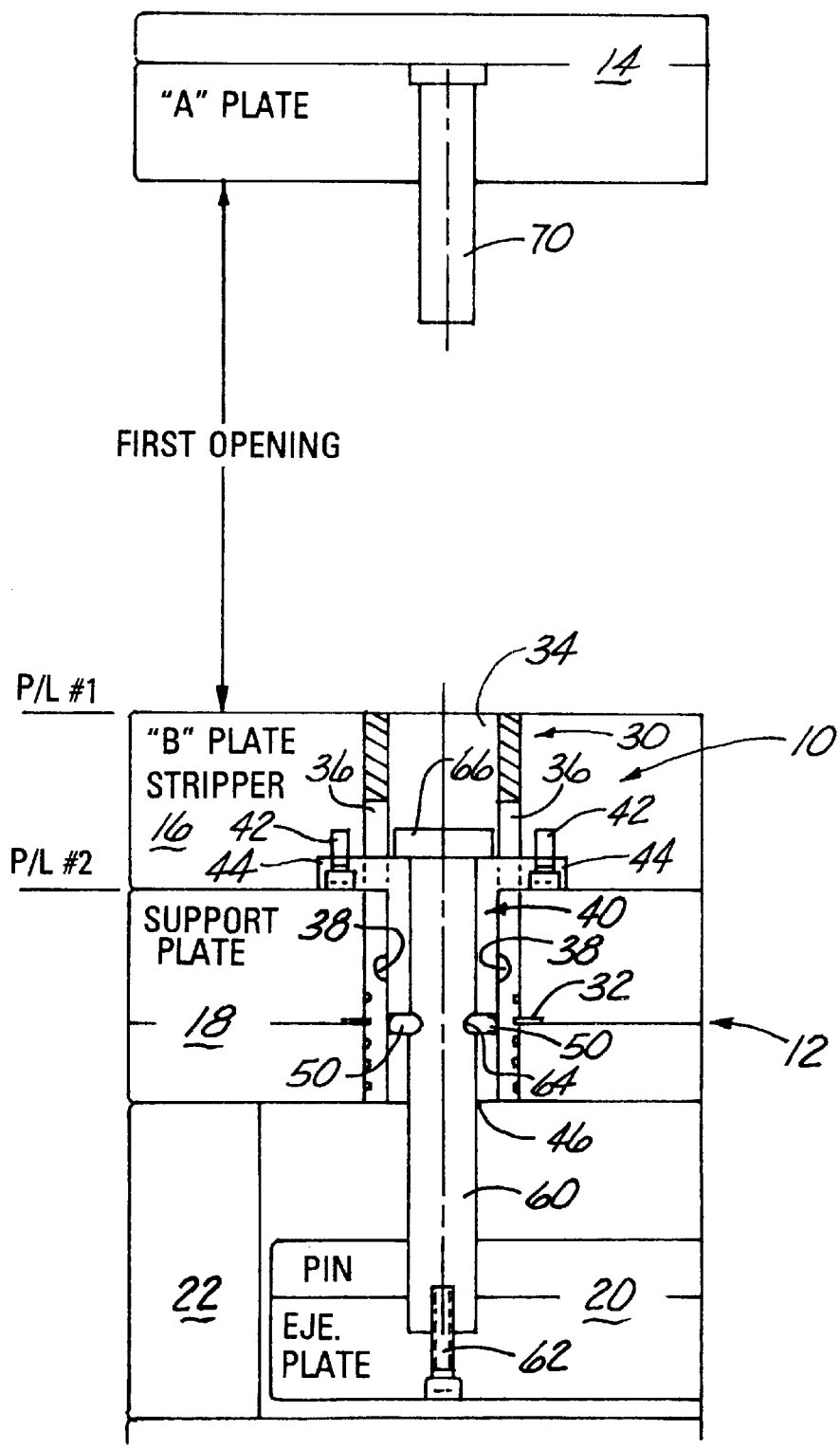
FIG. 2 is a sectional view similar to FIG. 1, but showing the mold open at the first parting line where the stationary plate is spaced apart from the stripper plate, and the ejection plate and stripper plate are locked together by engagement of the cam retainers in the groove of the ejector pin.
Figure 3:
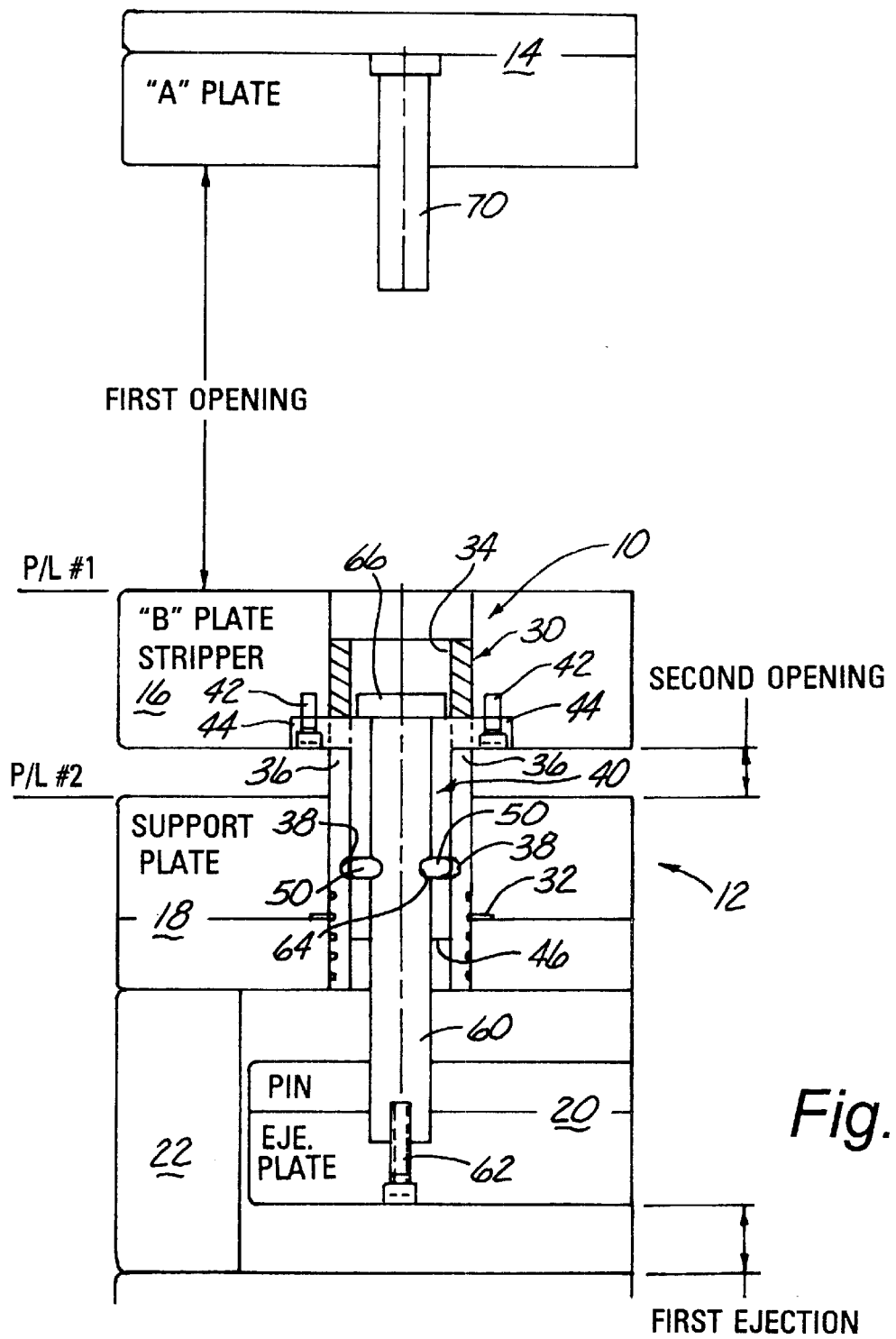
FIG. 3 is a sectional view similar to FIGS. 1 and 2, but showing the mold open at the second parting line where the stripper plate is spaced apart from the support plate, and the ejection plate is moved to the first ejection position while still locked against movement with respect to the stripper plate.

Although not required for the system 10 to function, a return pin 70 may be attached to the stationary plate 14 disposed to engage the heel 66 of the ejector pin 60 when the mold 12 is closed to move the ejector pin 60 to the position shown in FIG. 1.

The two-state ejector system 10 is very useful since it is internal to the mold 12, allows for movement of the different plates at the same time and then allows other plates to move independently, and uses round components that are easy to machine.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A two-stage ejection system for an injection mold having in sequence a stationary plate, a stripper plate, a support plate and an ejection plate, the plates being selectively movable with respect to each other, a first parting line disposed at contacting surfaces of the stationary plate and the stripper plate, a second parting line disposed at the contacting surfaces of the stripper plate and the support plate, the ejection plate being sequentially movable toward the support plate to a first ejection position and a second ejection position, the ejection system comprising:

an external bushing received within a bore in the stripper plate and support plate and secured against movement with respect to the support plate, the external bushing including a fist axial bore with a pair of opposed axially directed slots and an internal annular groove formed therein;

an internal bushing received within the first axial bore of the external bushing and being secured against movement with respect to the stripper plate, the internal bushing including a pair of wings disposed to slidably engage the slots of the external bushing and a second axial bore with a plurality of radially directed cam retainers movable to selectively extend outwardly to engage the internal annular groove of the external bushing or to extend inwardly;

an ejector pin received within the second axial bore of the internal bushing and being secured against movement with respect to the ejection plate, the ejector pin including an external annular groove formed therein disposed to selectively receive the cam retainers when they extend inwardly from the second axial bore of the internal bushing, the ejector pin further including a heel disposed to engage an end of the internal bushing to align the external annular groove of the ejector pin with the cam retainers in the internal bushing;

wherein selective engagement of the cam retainers with the external annular groove on the ejector pin holds the ejection plate from moving with respect to the stripper plate when the mold is opened at the second parting line and the ejection plate moves to the first ejection position, and selective engagement of the cam retainers with the internal annular groove on the external bushing holds the support plate from moving with respect to the stripper plate as the ejection plate moves to the second ejection position.

2. The ejection system of claim 1 further including a reset pin attached to the stationary plate and disposed to engage the heel of the ejector pin as the mold is closed to bring the plates together at the first and second parting lines, and move the ejector pin so that the heel engages the end on the internal bushing and the cam retainers engage the external annular groove of the ejector pin.

\* \* \* \* \*